United States Patent Office 2,724,721
Patented Nov. 22, 1955

2,724,721

MERCAPTALS OF HALOGENATED SALICYLALDEHYDES

Laszlo Reiner, Essex Fells, and Virginia S. Miller, Glen Rock, N. J., assignors to Wallace & Tiernan Incorporated, a corporation of Delaware No Drawing. Application April 9, 1953,
Serial No. 347,842

13 Claims. (Cl. 260—516)

This invention relates to new organic chemical compounds and specifically relates to a new class of compounds, which are to be designated as the mercaptals of halogenated salicylaldehydes.

The new compounds, as further defined below, are intended primarily for use as antifungal and antibacterial agents in general. Thus they may be used, as in solutions or other suitable compositions, for preventing or arresting fungus growth on various materials, fabrics and products. They are effective in the treatment of fungous infections, for example, being used in the form of powder or made up with conventional vehicles in ointment or lotion form for the care of such infections of the skin. The utility of the compounds in human and veterinary medicine is enhanced by their low toxicity. They may be used as urinary antiseptics, and the iodine-containing members of the group are useful both as urinary antiseptics and as radio-opaque substances in urography.

We have now discovered, however, a group of distinctly new and very useful compounds, as more particularly identified hereinbelow. We have further discovered that these new compounds, i. e. a specific group of mercaptals of certain halogenated salicylaldehydes, have unexpected characteristics which represent marked superiority, for instance for the uses noted above.

These compounds possess remarkable and outstanding physical and biological properties which make them useful as antifungal and antibacterial agents in general and particularly as active ingredients in preparations used in human and veterinary medicine. The acids and esters in this new class of compounds are soluble in slightly polar organic solvents. The free acids and alkali metal salts are soluble in water. The zinc, aluminum and alkaline earth salts are sparingly soluble in water. Consequently, properly selected compounds of this group may be incorporated, as desired, into aqueous solutions, solutions containing an organic solvent, ointments or dusting powders. Beside being both antifugal and antibacterial agents, these compounds have a remarkably low toxicity. After oral and parenteral administration they appear in high concentrations in the urine so that they may be used as urinary antiseptics. The iodine-containing members of the group are radio-opaque and can be used for that purpose in urography.

The new compounds can be characterized by the following general formula:

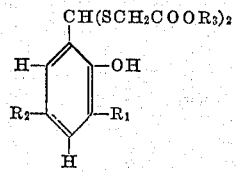

Where $R_1$ is selected from the class consisting of hydrogen and the halogens having atomic weights greater than fluorine; $R_2$ is a halogen having atomic weight greater than fluorine; and $R_3$ is chosen so that the compound is one of the class consisting of acids, salts, and esters formed by short alkyl groups, all of which appear to exhibit the valuable properties noted above. Thus conveniently, $R_3$ may be chosen as any member of the category of hydrogen, alkyl radicals containing not more than four carbon atoms, ammonium, substituted ammonium (i. e. ammonium substituted by one or two hydrocarbon residues containing, together, less than a total of 13 carbon atoms), and metals as represented by sodium, potassium, calcium, magnesium, aluminum and zinc.

The mercaptans used for the preparation of these compounds comprise thioglycolic acid and its esters. It has been discovered that the new compounds can be prepared from these mercaptans by various methods analogous to those used for the preparation of mercaptals in general. The halogenated aldehyde is dissolved in the thioglycolic acid or in a solution of the acid in benzene or some other suitable organic solvent such as ether, chloroform, cyclohexane or other related solvents and is allowed to stand for a period of time, or alternatively may be heated, preferably to temperatures not greater than 100° C. The desired mercaptal usually crystallizes on standing at room temperatures or in the cold. Various acidic catalysts can be used to enhance the reaction, for example, dry hydrogen chloride, p-toluenesulfonic acid, zinc chloride, potassium bisulfate, ferric chloride or ammonium chloride. In some cases, it may be necessary to remove the solvent in vacuo, wash the residue with an organic solvent to remove any unreacted aldehyde and acid, and then recrystallize the acid from water or alcohol.

For the preparation of the esters of these mercaptals, esters of the thiocarboxylic acid may be used in a method generally following the method outlined above for use with the acid. Alternatively, the acid mercaptal may be made first and then esterified by dissolving it either directly in the alcohol to be used for esterification, or in a solution of that alcohol in an inert organic solvent, and then heating the mixture in the presence of an acidic catalyst such as hydrochloric acid or p-toluenesulfonic acid.

The salts of the mercaptals are prepared by neutralizing solutions of the acid mercaptal with the metal hydroxide or alkoxide and if necessary precipitating the salt thus formed with an organic solvent such as alcohol or acetone, or by neutralizing the aqueous solution of the acid mercaptal with a water-soluble salt of the metal and a weak acid. Among such water-soluble salts are the acetates, propionates and succinates. For the preparation of the zinc and aluminum salts of these acids, aqueous solutions are used. In such cases, the mercaptal salt precipitates immedaitely after the addition of the water-soluble metal salt. These products may be further purified by washing with hot alcohol.

It will now be apparent that the new mercaptals can be explicitly defined as halogenated salicylal bis-thioglycolic acids and their salts and esters. As in effect representing examples of the variety of such compounds that can be made by the described reactions using halogenated aldehydes, the following are the aldehydes which may be so employed for preparing the compounds:

5-chlorosalicylaldehyde
5-bromosalicylaldehyde
5-iodosalicylaldehyde
5,3-dichlorosalicylaldehyde
5,3-dibromosalicylaldehyde
5,3-diiodosalicylaldehyde
5-chloro-3-bromosalicylaldehyde
5-chloro-3-iodosalicylaldehyde
5-bromo-3-chlorosalicylaldehyde
5-bromo-3-iodosalicylaldehyde
5-iodo-3-chlorosalicylaldehyde
5-iodo-3-bromosalicylaldehyde The following specific illustrations are given of compounds within the scope of the invention and methods of preparing them.

*Example I*

5-chlorosalicylaldehyde dicarboxymethyl mercaptal is prepared by mixing 626 gms. of 5-chlorosalicylaldehyde with 737 gms. of thioglycolic acid in benzene (2400 ccs.) in a two necked flask equipped with a Dean-Stark apparatus, condenser and mechanical stirrer. The resulting solution is kept at reflux temperature until the theoretical amount of water has been collected. The resulting mixture, containing a crystalline precipitate, is cooled, filtered, and the solid is washed with cold benzene. It is recrystallized from water. The white, crystalline product melts at 131–132° C. (uncorrected), and analyzes correctly for the desired compound.

*Example II*

5-bromosalicylaldehyde dicarboxymethyl mercaptal is prepared from 5-bromosalicylaldehyde and thioglycolic acid by using conditions similar to those given in Example I except that 0.1 gm. of p-toluenesulfonic acid is added to enhance the rate of reaction. After recrystallization from water the pure compound is obtained; M. P. 130.5–133° C. (uncorrected); it analyzes correctly for the desired compound.

*Example III*

5-iodosalicylaldehyde dicarboxymethyl mercaptal is prepared from 5-iodosalicylaldehyde and thioglycolic acid under conditions essentially similar to those used in Example I except that chloroform is used as a solvent and dry hydrogen chloride is used as a catalyst. After removal of excess solvent and cooling, a crystalline product is obtained which is filtered, washed with cold chloroform, and dried, if necessary recrystallized from water. M. P. 146.5–148° C. (uncorrected); it analyzes correctly for the desired compound.

*Example IV*

3,5-dichlorosalicylaldehyde dicarboxymethyl mercaptal is prepared by mixing one mole of 3,5-dichlorosalicylaldehyde with two moles of thioglycolic acid using ether as a solvent. Dry hydrogen chloride is passed through this solution until the ether is saturated with hydrogen chloride. The reaction mixture is allowed to warm up to reflux temperature and is stirred for an hour or two. The solvent and hydrogen chloride are evaporated in vacuo and the solid is recrystallized from a mixture of alcohol and water. A white, crystalline compound is obtained, melting at 148.5–150° C. (uncorrected); it analyzes correctly for the desired compound.

*Example V*

3,5-dibromosalicylaldehyde dicarboxymethyl mercaptal is prepared from 3,5-dibromosalicylaldehyde and thioglycolic acid using the proportions of one mole of the aldehyde and two moles of thioglycolic acid under conditions similar to those given in Example IV except that cyclohexane is used as a solvent and small amounts of zinc chloride are added as a catalyst. After completion of the reaction, the reaction mixture is cooled, the crystalline solid is filtered, washed with water, and if necessary recrystallized from a mixture of benzene and ethyl acetate. The white crystalline product thus obtained melts at 146–148° C. (uncorrected); it analyzes correctly for the desired compound.

*Example VI*

3,5-diiodosalicylaldehyde dicarboxymethyl mercaptal is prepared from 3,5-diiodosalicylaldehyde and thioglycolic acid using two moles of thioglycolic acid to one mole of the aldehyde under conditions identical to those given in Example II for the preparation of 5-bromosalicylaldehyde dicarboxymethyl mercaptal. M. P. 149–151.5° C. (uncorrected); it analyzes correctly for the desired compound.

*Example VII*

The sodium salt of the dicarboxymethyl mercaptal of 5-bromosalicylaldehyde is prepared by adding 20 gms. of sodium ethoxide in ethyl alcohol to an alcohol solution containing 48 gms. of the acid mercaptal. The solid that separates is recrystallized from 90% aqueous alcohol. It analyzes correctly for the sodium salt.

*Example VIII*

The zinc salt of 5-chlorosalicylaldehyde dicarboxymethyl mercaptal is prepared by dissolving 129 gms. of the acid mercaptal in 200 ml. of warm water, cooling and adding 31 gms. of NaOH dissolved in 100 ml. of water. To the solution there is added, with stirring, 88 gms. of zinc acetate dihydrate dissolved in 300 ml. of water. The resulting crystalline salt of the mercaptal is filtered, washed first with water, then with ethyl alcohol and dried. The material analyzes correctly for the desired compound.

*Example IX*

5-chlorosalicylaldehyde dicarbomethoxymethyl mercaptal is prepared by mixing 15.6 gms. of the aldehyde and 21.2 gms. of methyl thioglycolate in 60 ccs. of benzene and adding 0.2 gms. of p-toluenesulfonic acid to enhance the rate of reaction. The reaction mixture is refluxed until the theoretical amount of water has been collected in a Dean-Stark apparatus. The reaction mixture is repeatedly extracted with 5% aqueous sodium bicarbonate; dried by adding sodium sulfate, filtered, and the benzene is removed in vacuo. The residue is recrystallized from a mixture of ether and petroleum ether. B. P. 35–60° C. M. P. 61–62.5° C. (uncorrected). The white, crystalline material analyzes correctly for the desired compound.

While certain specific examples of compounds and methods of preparing them are given above, the invention is not limited to these specific compounds and methods, but includes within its scope the compounds covered by the general structural formula given above, and related methods of preparation within the scope of the methods outlined broadly above. For instance, it will be apparent that in many cases various solvents, catalysts and procedural techniques recited as used in producing specific compounds may be alternatively employed in producing others of the group of compounds. Likewise, procedures similar to those set forth can be used for making other compounds of the invention in the acid, ester, or salt form, for example the dicarboxymethyl mercaptals respectively of the other halogenated salicylaldehydes itemized hereinabove and not specifically mentioned in Examples I to IX. While certain beneficial uses of these compounds are stated above, it should be understood that the invention is not limited to any particular use of these compounds but is directed to the compounds per se, regardless of the use to which they may be put.

We claim as our invention:

1. Halogenated salicylal bis-thioglycolic acids and their salts and esters, said acids having the formula:

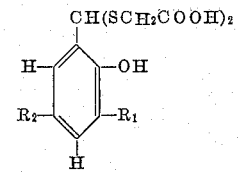

wherein $R_1$ is selected from the class consisting of hydrogen and the halogens having atomic weights greater than fluorine, and $R_2$ is a halogen of atomic weight greater than fluorine.

2. A compound according to claim 1, in which $R_1$ is hydrogen.

3. A compound according to claim 1, in which $R_1$ is hydrogen and $R_2$ is chlorine.

4. A compound according to claim 1 in which $R_1$ is hydrogen and $R_2$ is bromine.

5. A compound according to claim 1 in which $R_1$ is hydrogen and $R_2$ is iodine.

6. A compound according to claim 1 in which $R_1$ is chlorine.

7. A compound according to claim 1 in which $R_1$ and $R_2$ are each chlorine.

8. A compound according to claim 1 in which $R_1$ is iodine.

9. A compound according to claim 1 in which $R_1$ and $R_2$ are each iodine.

10. The process of preparing a mercaptal of a halogenated salicylaldehyde, which comprises reacting a halogenated salicylaldehyde with a compound selected from the class consisting of thioglycolic acid and its esters.

11. The process as defined in claim 10, in which the reaction is carried out in the presence of an acidic catalyst.

12. The process as defined in claim 10, in which the reaction is carried out in an organic solvent.

13. The process of preparing a mercaptal of a halogenated salicylaldehyde in the form of a salt, which comprises reacting a halogenated salicylaldehyde with thioglycolic acid to produce the acid mercaptal and neutralizing said acid mercaptal with a compound of a salt-forming cation, said last mentioned compound being selected from the class consisting of hydroxides, alkoxides and water-soluble salts.

References Cited in the file of this patent

Bongarz, Berichte (vol. 21 (1)), pgs. 478–481 (1888).